(12) United States Patent
Murdock et al.

(10) Patent No.: US 7,013,357 B2
(45) Date of Patent: Mar. 14, 2006

(54) ARBITER HAVING PROGRAMMABLE ARBITRATION POINTS FOR UNDEFINED LENGTH BURST ACCESSES AND METHOD

(75) Inventors: Brett W. Murdock, Round Rock, TX (US); William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 229 days.

(21) Appl. No.: 10/660,845

(22) Filed: Sep. 12, 2003

(65) Prior Publication Data

US 2005/0060455 A1    Mar. 17, 2005

(51) Int. Cl.
*G06F 13/38* (2006.01)

(52) U.S. Cl. .................................... 710/240
(58) Field of Classification Search ................ 710/240
See application file for complete search history.

(56) References Cited

U.S. PATENT DOCUMENTS

| | | | |
|---|---|---|---|
| 4,275,440 A | 6/1981 | Adams et al. | |
| 4,710,916 A | 12/1987 | Amstutz | |
| 4,912,632 A | 3/1990 | Gach et al. | |
| 4,987,529 A | 1/1991 | Craft et al. | |
| 5,072,365 A | 12/1991 | Burgess et al. | |
| 5,416,910 A | 5/1995 | Moyer et al. | |
| 5,506,972 A | 4/1996 | Heath et al. | |
| 5,535,333 A | 7/1996 | Allen, Jr. et al. | |
| 5,740,376 A * | 4/1998 | Carson et al. | ................ 710/35 |
| 5,758,105 A | 5/1998 | Kelley et al. | |
| 5,802,581 A | 9/1998 | Nelson | |
| 5,822,758 A | 10/1998 | Loper et al. | |
| 5,889,973 A | 3/1999 | Moyer | |
| 5,894,562 A * | 4/1999 | Moyer | ................ 710/113 |
| 5,944,800 A | 8/1999 | Mattheis et al. | |
| 6,032,232 A | 2/2000 | Lindeborg et al. | |
| 6,088,751 A | 7/2000 | Jaramillo | |
| 6,138,200 A * | 10/2000 | Ogilvie | ................ 710/244 |
| 6,330,646 B1 | 12/2001 | Clohset et al. | |
| 6,353,876 B1 * | 3/2002 | Goodwin et al. | ........... 711/143 |
| 6,513,089 B1 | 1/2003 | Hofmann et al. | |
| 6,564,304 B1 | 5/2003 | Van Hook et al. | |
| 6,671,284 B1 | 12/2003 | Yonge, III et al. | |
| 6,687,821 B1 | 2/2004 | Hady et al. | |
| 6,775,727 B1 * | 8/2004 | Moyer | ................ 710/113 |
| 2002/0062414 A1 | 5/2002 | Hofmann et al. | |

OTHER PUBLICATIONS

U.S. Appl. No. 09/888,278 fled Jun. 23, 2001.
AMBA™ Specification (Rev 2.0); 1999; 2 cover pages and 3-1 thru 3-58; ARM.

* cited by examiner

*Primary Examiner*—Tim Vo
*Assistant Examiner*—Christopher Daley
(74) *Attorney, Agent, or Firm*—Robert L. King; Daniel D. Hill (57) ABSTRACT

An arbitration control circuit (11) for arbitrating access to a slave device (4) by a plurality of master devices (2, 3) includes an undefined length burst (ULB) arbitration logic circuit (12). The ULB arbitration logic circuit (12) includes a counter (26) and a control register (24). The control register (24) stores a predetermined value. During a ULB access of the slave device (4), the counter (26) is loaded with the predetermined value and is decremented for each beat of the undefined length burst access. Arbitration of the slave device (4) is only allowed after the predetermined number of access beats during the undefined length burst access.

20 Claims, 5 Drawing Sheets

CONTROL REGISTER — 24

| BIT | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| NAME | RESERVED | | | | | | | | | | | | | | | |
| TYPE | r | r | r | r | r | r | r | r | r | r | r | r | r | r | r | r |
| RESET | 0 | 0 | 0 | 0 | 0 | 0 | 0 | 0 | 0 | 0 | 0 | 0 | 0 | 0 | 0 | 0 |
| BIT | 15 | 14 | 13 | 12 | 11 | 10 | 9 | 8 | 7 | 6 | 5 | 4 | 3 | 2 | 1 | 0 |
| NAME | RESERVED | | | | | | | | | | | AULBL | | | AULBM | |
| TYPE | r | r | r | r | r | r | r | r | r | r | r | rw | rw | rw | rw | rw |
| RESET | 0 | 0 | 0 | 0 | 0 | 0 | 0 | 0 | 0 | 0 | 0 | 0 | 0 | 0 | 0 | 0 |

*FIG. 4*

| AULBM | 0 | AFTER THE FIRST AULBL BEATS THE UNDEFINED LENGTH BURST ACCESS WILL BE OPEN FOR ARBITRATION ON ANY FOLLOWING BEAT. |
|---|---|---|
| | 1 | THE UNDEFINED LENGTH BURST ACCESS WILL BE OPEN TO ARBITRATION ONLY EVERY AULBL BEATS. |
| AULBL | 000 | ALWAYS ARBITRATE DURING UNDEFINED LENGTH BURST ACCESSES |
| | 001 | NEVER ARBITRATE DURING UNDEFINED LENGTH BURST ACCESSES |
| | 010 | ARBITRATE UNDEFINED LENGTH BURST ACCESSES AFTER TWO BEATS (AULBM = 0) OR EVERY SECOND BEAT (AULBM = 1) |
| | 011 | ARBITRATE UNDEFINED LENGTH BURST ACCESSES AFTER THREE BEATS (AULBM = 0) OR EVERY THIRD BEAT (AULBM = 1) |
| | 100 | ARBITRATE UNDEFINED LENGTH BURST ACCESSES AFTER FOUR BEATS (AULBM = 0) OR EVERY FOURTH BEAT (AULBM = 1) |
| | 101 | ARBITRATE UNDEFINED LENGTH BURST ACCESSES AFTER FIVE BEATS (AULBM = 0) OR EVERY FIFTH BEAT (AULBM = 1) |
| | 110 | ARBITRATE UNDEFINED LENGTH BURST ACCESSES AFTER SIX BEATS (AULBM = 0) OR EVERY SIXTH BEAT (AULBM = 1) |
| | 111 | ARBITRATE UNDEFINED LENGTH BURST ACCESSES AFTER SEVEN BEATS (AULBM = 0) OR EVERY SEVENTH BEAT (AULBM = 1) |

ARBITER HAVING PROGRAMMABLE ARBITRATION POINTS FOR UNDEFINED LENGTH BURST ACCESSES AND METHOD

CROSS REFERENCE TO RELATED APPLICATION

This application is related to U.S. patent application Ser. No. 09/888,278, now U.S. Pat. No. 6,775,727 entitled "System and Method For Controlling Bus Arbitration During Cache Memory Burst Cycles" and assigned to the assignee hereof.

FIELD OF THE INVENTION

The present invention relates generally to data processors, and more particularly to controlling undefined length burst access arbitration points in a data processing system.

BACKGROUND OF THE INVENTION

Shared system buses or crossbar switches are typically used in a data processing environment to couple two or more master devices to one or more slave devices. A crossbar switch functions as an interconnect via a dedicated, point-to-point interface. The crossbar switch contains one or more arbiters to determine which bus master device is allowed to access any predetermined one of the slave devices when more than one bus master device is attempting to access the same slave device. A shared system bus functions as an interconnect via a shared set of connections. Arbitration circuitry is also used to determine which bus master device is allowed to access any predetermined one of the slave devices when more than one bus master device is attempting to access the bus. Various arbitration protocols exist for determining how and when to award a requested system resource to multiple requesters. Such protocols include, among many, prioritization rankings, round-robin arbitration and forced automatic release at some point after two requesters are acknowledged.

For enhanced efficiency, the communication between a master device and a slave device may be implemented with bursts of information being communicated wherein multiple data access beats are consecutively transferred. Some systems function with a known and defined number of data access beats, such as a cache with a line fill of predetermined length. However, other systems do not always utilize a fixed number of data access beats. In such systems, at least some burst accesses may be variable in length, without utilizing a fixed number of data access beats. Such bursts may be referred to as variable length bursts, unbounded bursts, unlimited bursts, or undefined length burst interchangeably, depending on the terminology in use. In such cases, the master may or may not know the actual or ultimate length (or number of beats) of the burst transfer, and in most cases, the slave device being addressed does not know the ultimate length of the burst, nor does the arbiter(s). The actual length of the burst may be dependent on a number of factors which may cause it to not be possible to predetermine the actual length at the time the burst is initiated, or, it may be predeterminable only by the master, but without a means to indicate the ultimate length of the burst to other components of the system. In such a system, when a particular master device is given control over a slave device to either transmit or receive information therewith using unlimited or variable length burst accesses, a problem results for other master devices seeking to communicate with the same slave device.

Known systems have typically handled this operating condition by either forcing the current master device to release control of the slave device or to be permitted to continue use of the slave device until the burst access has completed. For either of these operating extremes, system performance may suffer. When mastership is immediately forced, system performance is degraded from having to perform multiple initiation accesses that have a time overhead penalty. As a result, the advantages of burst operation are reduced if not lost. When mastership is allowed to continue indefinitely, a more urgent or higher priority master device may be forced to wait on the existing undefined length burst access, thereby degrading system performance.

BRIEF DESCRIPTION OF THE DRAWINGS

The present invention is illustrated by way of example and not limitation in the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Generally, the present invention provides an arbiter in a data processing system that uses burst information transfers of unknown length wherein the points in time when arbitration is permitted is programmable by a user. The user may select how many access beats will be transmitted between a master device and a slave device before allowing access to the slave device to be arbitrated, or may select a number of system clock cycles which should occur before allowing arbitration for the slave device. Once a programmed point in time is reached, any type of arbitration protocol may be used to determine whether access to the slave device will be changed to another master device. As taught herein, the effectiveness of the burst access is efficiently utilized by permitting a programmable number of low latency accesses to be made after a higher overhead initiation operation for a burst is performed.

As used herein, the terms "variable length bursts", "unlimited bursts", "unknown bursts", or "undefined length bursts" are used interchangeably throughout this description and are intended to describe burst transfers that do not have a predetermined length known by all system elements involved in the burst transfer.

Figure 1:
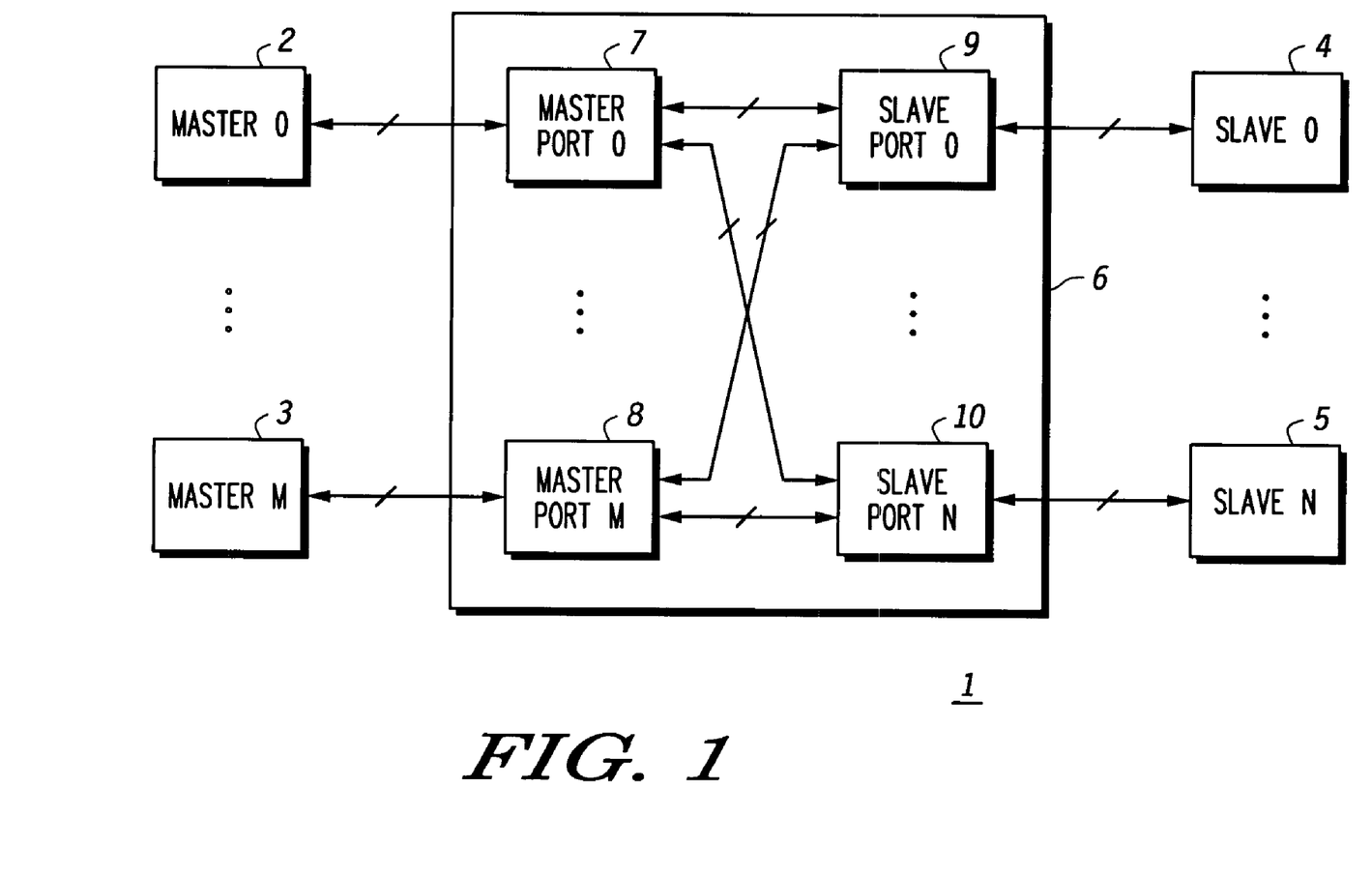
FIG. 1 illustrates a block diagram of a data processing system having multiple master devices and slave devices interfaced by an arbiter in accordance with one embodiment of the present invention.

The invention can be better understood with reference to FIGS. 1–7. FIG. 1 illustrates a data processing system 1 having a plurality of M+1 master devices. For example, the plurality includes a master device 2 and a master device 3 with any number of other master devices, including no other master devices. A crossbar switch or arbiter 6 interfaces the master devices with a plurality of N+1 slave devices, where N may or may not be equal to M. N may be zero, but M must be at least one. For example, a first slave device 4 and an Nth slave device 5 are illustrated with any number, including zero, of additional slave devices. The arbiter 6 has a plurality of master ports for interfacing with the master devices and a plurality of slave ports for interfacing with the slave devices. For example, master device 2 is connected to a master port 7 via a bi-directional multiple conductor bus. Master port 7 is connected via a separate bidirectional multiple conductor bus to each of a plurality of N+1 slave ports, such as slave port 9 and slave port 10. It should be well understood that in another form only one slave port may be implemented. Slave port 9 is connected to slave device 4 via a bi-directional multiple conductor bus to slave device 4. Similarly, slave port 10 is connected to slave device 5 via a bi-directional multiple conductor bus to slave device 5. Therefore, for each master device there is a corresponding master port. For each slave device there is a corresponding slave port. Each of the illustrated buses includes data, addressing and control conductors. Some examples of devices that are master devices include a data processor or microprocessor, a microcontroller, a CPU core, a digital signal processor, a direct memory access (DMA) master, a graphics processor and various other types of bus masters that are known in the art to be masters. Some examples of devices that are slave devices include memory devices such as ROM, RAM, DRAM, Flash memory, SDRAM, etc., as well as peripheral devices such as a general purpose input/output (I/O) device, an LCD frame buffer, a FIFO slave device, and serial peripherals such as UARTs, SSI, I$^2$C, SPI as well as any other types of slave device that are known in the art to be slaves.

In operation, arbiter 6 functions to control access to each slave device by the master devices. Because any master device may desire to communicate with any of the slave devices, it is common for more than one master device to want access to the same slave device at the same time. Therefore, in one form of the arbiter described herein, within each master port and each slave port is arbitration logic that is required to determine which bus master is being acknowledged by each slave device.

Figure 2:
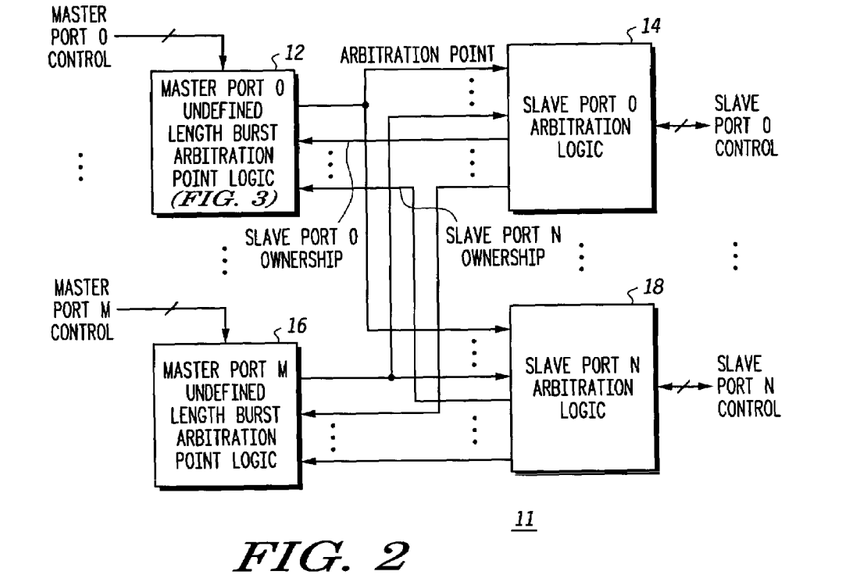
FIG. 2 illustrates a block diagram of a portion of control logic of the arbiter of FIG. 1.

Illustrated in FIG. 2 is a control portion 11 of the arbiter 6 of FIG. 1. In particular, there is a plurality of M+1 circuits that function as a master port undefined length burst (ULB) arbitration point logic circuit, such as master port 0 undefined length burst arbitration point logic 12 and master port M undefined length burst arbitration point logic 16. There is a plurality of N+1 circuits that function as slave port arbitration logic, such as slave port 0 arbitration logic 14 and slave port N arbitration logic 18. The master port 0 ULB arbitration point logic 12 has a first input for receiving a multiple bit master port 0 control signal, an output connected to a first input of each of slave port arbitration logic 14 and slave port arbitration logic 18. A first output of slave port arbitration logic 14 is connected to a second input of the master port ULB arbitration point logic 12. A first output of slave port N arbitration logic 18 is connected to a third input of master port 0 ULB arbitration point logic 12. The master port ULB arbitration point logic 16 has a first input for receiving a master port M control signal, and an output connected to a second input of each of slave port arbitration logic 14 and slave port arbitration logic 18. Slave port 0 arbitration logic 14 has a second output connected to a second input of the master port ULB arbitration point logic 16, and slave port N has a second output connected to a third input of the master port ULB arbitration point logic 16. An input/output terminal of slave port 0 arbitration logic 14 is connected via a multiple bit conductor to provide a slave port 0 control signal for slave device 4. An input/output terminal of slave port N arbitration logic 18 is connected via a multiple bit conductor to provide a slave port N control signal for slave device 5.

In operation, arbitration point logic 12 functions to monitor the associated master port control signal and the slave port ownership signals from the slave devices. In response, arbitration logic 12 generates an arbitration point signal that is connected to the N+1 slave port arbitration logic circuits. The N+1 slave port arbitration logic circuits use a predetermined arbitration protocol to determine how and when to award a requested system resource to multiple requesters. Such protocols may be any of a variety of conventional arbitration protocols. In contrast, the master port ULB arbitration point logic circuits function to determine when, if at all, the arbitration policy may be used during an undefined length burst access of one of the slave devices. For example, if master device 2 of FIG. 1 requests control of a predetermined one of the slave devices and does not presently have master status in the system 1, master port 0 control signal is asserted by master device 2. The master port 0 ULB arbitration point logic 12 selectively generates an arbitration point signal in a manner to be described in detail further below. If the ensuing arbitration policy awards mastership to master 0, then the requested slave will assert the corresponding slave port ownership signal indicating that mastership of that slave device exists.

Figure 3:
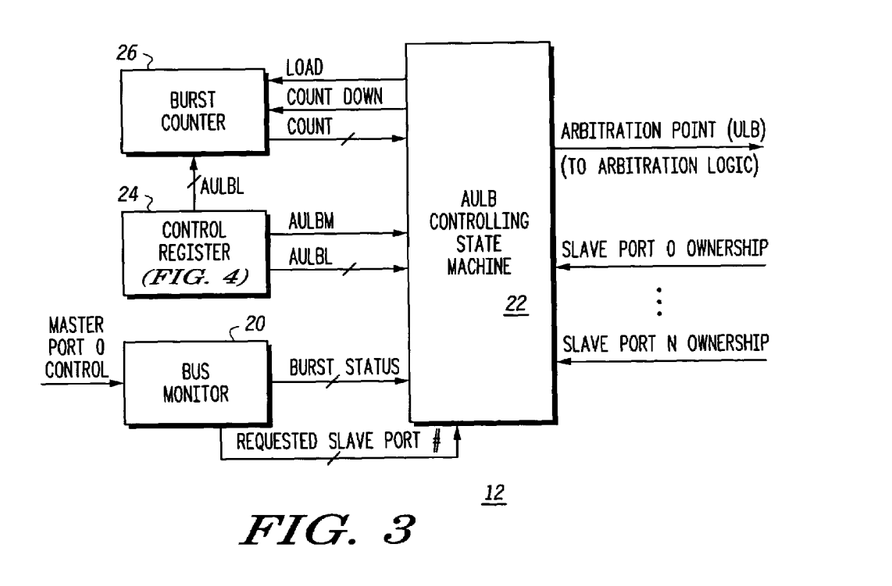
FIG. 3 illustrates a block diagram of arbitration point logic of the arbiter of FIG. 2.

Illustrated in FIG. 3 is a detailed block diagram of the master port 0 undefined length burst arbitration point logic 12 of FIG. 2. A bus monitor 20 has an input for receiving the master port 0 control signal. A first output of the bus monitor 20 provides a burst status signal and is connected to a first input of an AULB controlling state machine 22. A second output of the bus monitor 20 provides a slave port identifier signal labeled "Requested Slave Port #" and is connected to a second input of the AULB controlling state machine 22. A control register 24 has a first output labeled "AULBM" connected to a third input of the AULB controlling state machine 22. Control register 24 has a second output labeled "AULBL" connected to a fourth input of the AULB controlling state machine 22. A third output of the control register 24 also labeled "AULBL" is connected to a first input of a burst counter 26. It should be apparent that the two outputs of control register 24 that provide the AULBL signal may be combined as one output. An output of burst counter 26 is connected to a fifth input of the AULB controlling state machine 22 for providing a Count signal. A first output of the AULB controlling state machine 22 is connected to a first input of the burst counter 26 for providing a Load signal. A second output of the AULB controlling state machine 22 is connected to a second input of the burst counter 26 for providing a Count Down signal. A third output of the AULB controlling state machine 22 is connected to the slave port arbitration logic circuits for providing an Arbitration Point (ULB) signal. The AULB controlling state machine has a sixth input for receiving a Slave Port 0 Ownership signal.

The AULB controlling state machine 22 has a seventh input for receiving a Slave Port N Ownership signal.

In operation, stored within the control register 24 as user programmable values are values for AULBM and AULBL. These values may be programmed by one of several methods. For example, an instruction may be executed to place desired values within control register 24. Alternatively, default values may be placed in control register 24 depending upon an operating mode or context that the data processing system 1 is in. The bus monitor 20 functions to monitor a bus (not shown) and detect the assertion of the master port 0 control signal. The master port 0 control signal is asserted when the master 0 device 2 is requesting master status of a predetermined slave device. In response, the bus monitor 20 provides two control signals. The Requested Slave Port # identifies which slave device the master 0 device 2 is requesting bus ownership of. The Burst Status signal functions to identify whether the request from the bus master is for an undefined length burst transfer operation and whether the present beat is the first or a subsequent beat of the undefined length burst. The burst counter 26 is loaded with a value that is contained in the control register 24, under the control of the AULB controlling state machine 22. The burst counter 26 receives a Count Down signal that affects a count value provided to the AULB controlling state machine 22. The AULB controlling state machine 22 uses, among others, the Count, AULBM, AULBL, Burst Status and Requested Slave Port Number signals to implement the method of determining arbitration points in the system as will be described in further detail below. When an arbitration point is detected by the AULB controlling state machine 22, the Arbitration Point (ULB) signal is asserted. In response to providing ownership, each slave provides a corresponding slave port ownership signal as an acknowledgement that mastership has been recognized.

Figure 4:
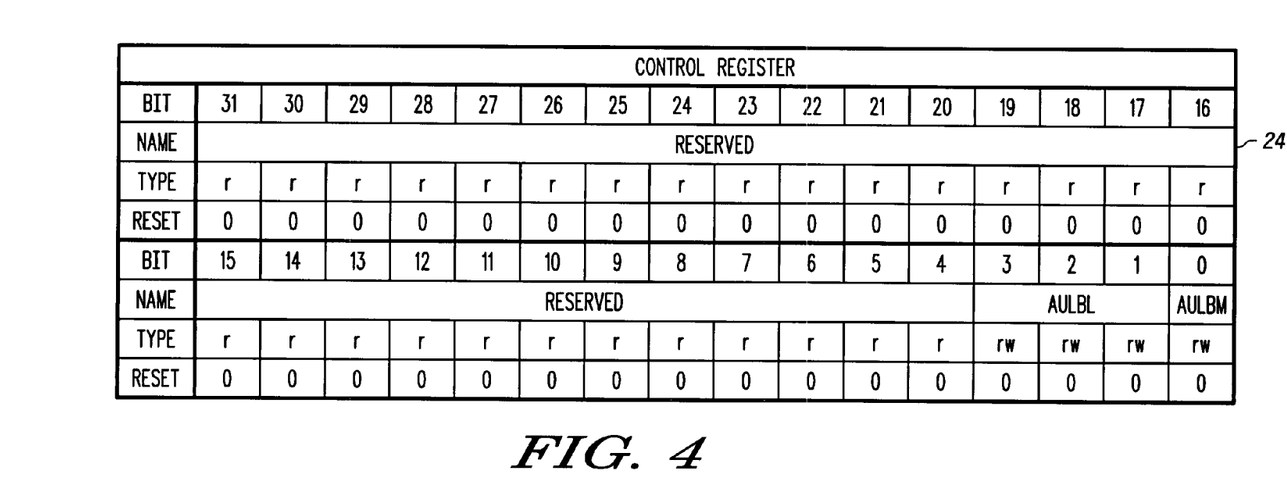
FIG. 4 illustrates in table form control storage fields for implementing programmable arbitration points in accordance with the present invention.

Illustrated in FIG. 4 is an example of one form of the control register 24 of FIG. 3. In particular, a thirty-two bit register is illustrated having a first field used by bit 0 and labeled AULBM. A second field is used by bits 1 through 3 and is labeled AULBL. In the illustrated form all other bit fields are illustrated as being reserved. However, other functions may be implemented with these bits. It should also be well understood that the number of bits used to implement the AULBL signal may be changed to include more or less than three. Also, the AULBM field may be expanded in number of bits to include other operating modes, including modes not associated with the arbitration function.

Figure 5:
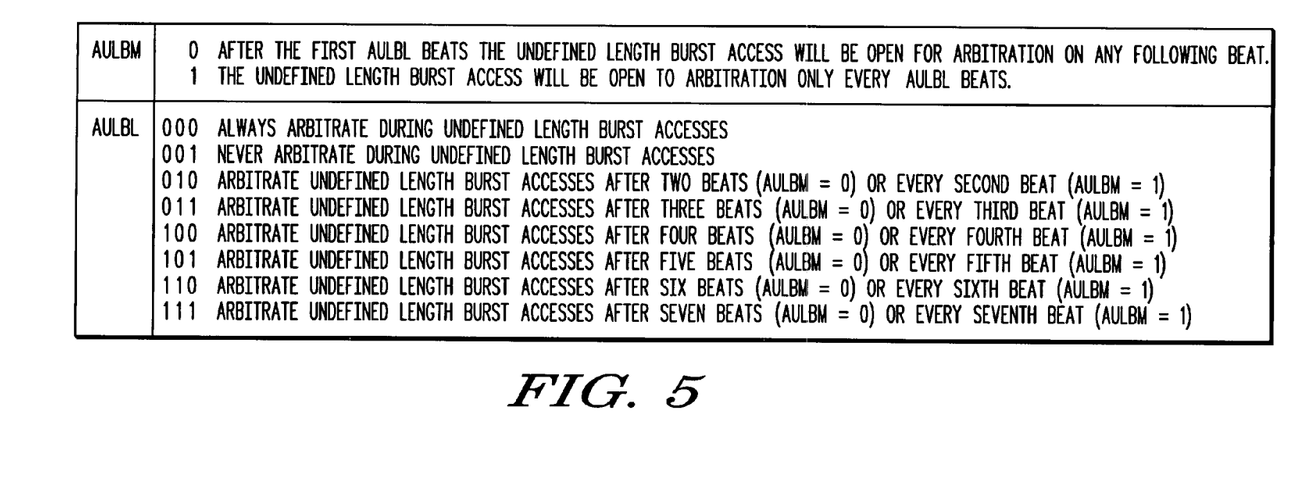
FIG. 5 illustrates in table form exemplary encodings of control values stored in the control storage fields of FIG. 4.

Illustrated in FIG. 5 is an encoding table that illustrates the definitions for the encoded values of signals AULBM and AULBL. In particular, when the bit AULBM has a logic zero, that value controls the AULB controlling state machine 22 so that after the first AULBL beats, the undefined length burst access is open for arbitration on any following beat until mastership is lost. Once the master loses mastership of a slave port but subsequently regains mastership, the count value is reset.

When the bit AULBM has a logic one, that value controls the AULB controlling state machine 22 so that the undefined length burst access will be open to arbitration only during every (AULBL)th beat. For example, if AULBL is encoded to have a value of five beats, then arbitration may occur only during every fifth beat. In this mode, the AULBL functions to form a modulo value around which arbitration may selectively occur. Also illustrated in FIG. 5 are eight bit encodings for AULBL when a three-bit value is implemented. When AULBL is zero, the AULB controlling state machine 22 will always allow arbitration during undefined length burst accesses. In other words, arbitration may occur at any time two bus master devices request the same slave device. When AULBL is one, the AULBL controlling state machine 22 will never allow arbitration during undefined length burst accesses. These two encodings represent two extremes and may not result in optimal system performance. When AULBL is two, the AULB controlling state machine 22 will arbitrate either only during the second beat or at any time after two beats of an undefined length burst depending upon the value of AULBM. It should be understood that variations may be used. For example, instead of using the timing of beats (i.e. bus cycles), the number of system clock cycles may be counted and used as the measurement for identifying arbitration points. It should also be well understood that other encodings for the AULBL value may be used. For example, any number of bits for AULBL may be used. Additionally, any number of beats or system clock cycles may be associated with a particular encoded value other than the values illustrated in FIG. 5. When AULBL is three, the AULB controlling state machine 22 will allow arbitration either only during every third beat or at any time after the first three beats of an undefined length burst depending upon the value of AULBM. When AULBL is four, the AULB controlling state machine 22 will allow arbitration either only every fourth beat or at any time after the first four beats of an undefined length burst depending upon the value of AULBM. When AULBL is five, the AULB controlling state machine 22 will allow arbitration either only every fifth beat or at any time after the first five beats of an undefined length burst depending upon the value of AULBM. When AULBL is six, the AULB controlling state machine 22 will allow arbitration either only every sixth beat or at any time after the first six beats of an undefined length burst depending upon the value of AULBM. When AULBL is seven, the AULB controlling state machine 22 will allow arbitration either only every seventh beat or at any time after the first seven beats of an undefined length burst depending upon the value of AULBM.

Figure 6:
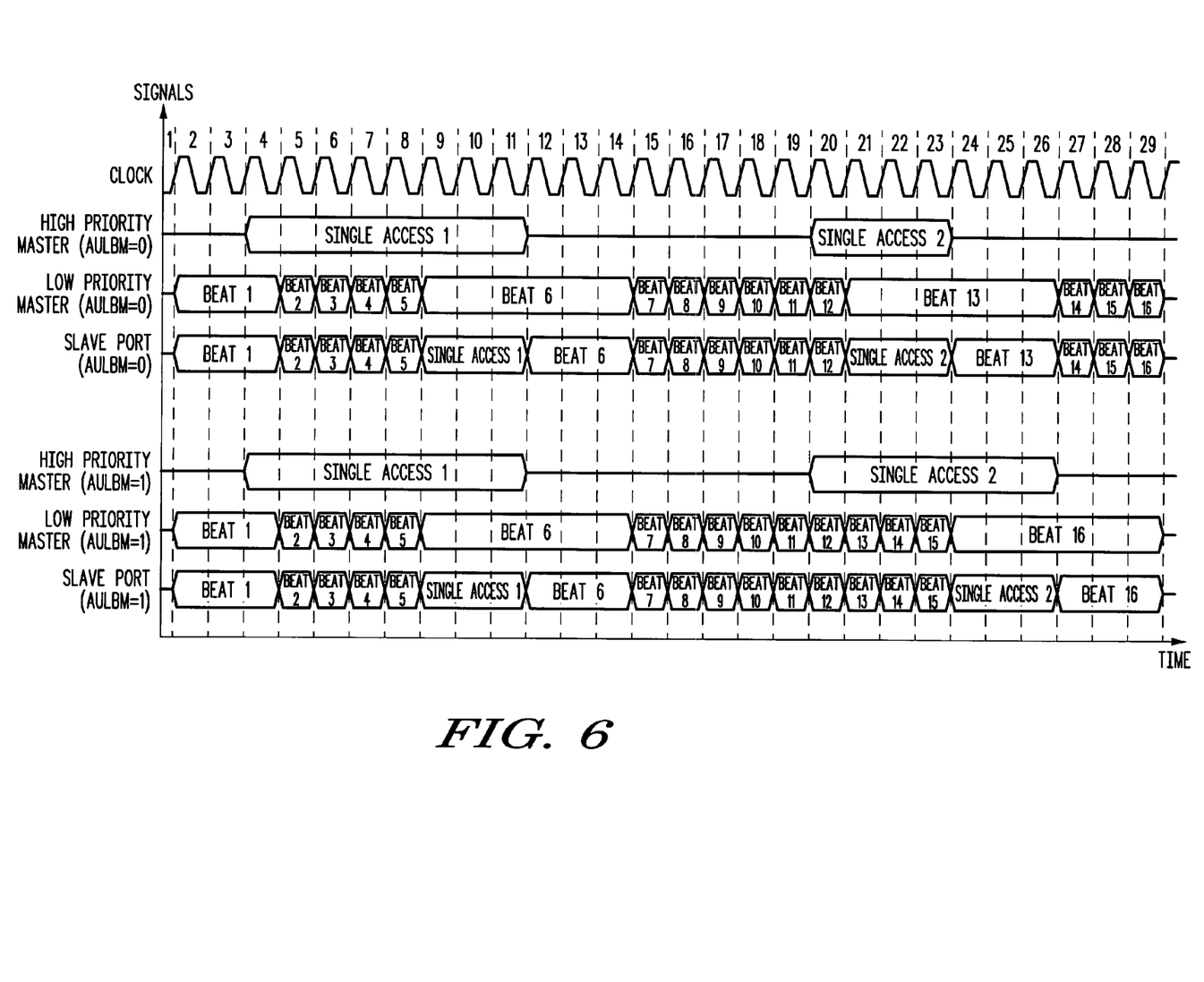
FIG. 6 illustrates a timing diagram of exemplary operation of the arbiter of FIG. 1 in accordance with the present invention.

Illustrated in FIG. 6 is a timing diagram of an example operation when AULBM is initially zero and then when AULBM is one. To illustrate the difference that the AULBM signal makes, the same access requests to a single slave port from the same masters are assumed. In both examples, a value of five is assumed for AULBL. Sequential clock cycles are illustrated. For the example where AULBM is zero, assume that a lower priority master that provides undefined length burst accesses, as determined by a predetermined arbitration policy implemented within the slave port arbitration logic, has master status over the slave. Therefore, the slave port communicates for the first five beats exactly what the low priority master is communicating. It should be noted that the first beat is longer in time than beats two through five because the first beat in a transaction requires significant initiation operations. Beginning at cycle four, a high priority master that is a single access master wants to have control of the same slave port. Since AULBL is five and AULBM is zero, the high priority master may only obtain control of the slave once the fifth beat has completed. Therefore, master control of the slave changes at the beginning of the sixth beat. At this point the count value is zeroed again and at least another five beats must occur before an arbitration opportunity is permitted once the low priority master regains mastership and resumes the undefined length burst access. As illustrated in the stream of the slave port for AULBM equal to zero, the single access 1 of the high priority master is permitted to occur until completion by the high priority master of the single access 1. During the time that the high priority master has control, the low priority master keeps beat 6 active. Upon completion of the single access 1 at the end of the eleventh clock cycle, the control is again changed and beat 6 is communicated at the slave port. Because this is a first beat for the slave port, initiation must occur. Therefore, beat six is not completed until the end of the fourteenth clock cycle. At the end of beat six, five more beats (beats 7–11) occur before another conflict for mastership is presented at the beginning of clock cycle twenty. Since at least five beats have occurred, arbitration is permitted immediately and the higher priority master is given control beginning with clock cycle twenty-one. During the arbitration cycle, beat twelve completes. Meanwhile, beat thirteen is held in abeyance by the low priority master until the end of the second single access (Single access 2) of the high priority master and the counter is reset so that at the release of mastership by the current master (the high priority master), the low priority master is assured of having at least five uninterrupted beats.

In contrast, assume that AULBM is equal to one which means that an arbitration point will be made available only every (AULBL)th beat. Although the same timing as described above regarding master requests from the high priority master and the low priority master exists, a different result occurs. Since the first single access request of the high priority master occurs during and after the fifth beat, the high priority master is given mastership the same time as in the prior example. However, when the second single access occurs at the beginning of clock cycle twenty, the twelfth beat is occurring. Because AULBL is five, the fifteenth beat of the low priority master must first be completed prior to allowing an arbitration point. Upon completion of the fifteenth beat, mastership changes at the twenty-fourth clock cycle (as opposed to the twenty-first clock cycle discussed above).

Figure 7:
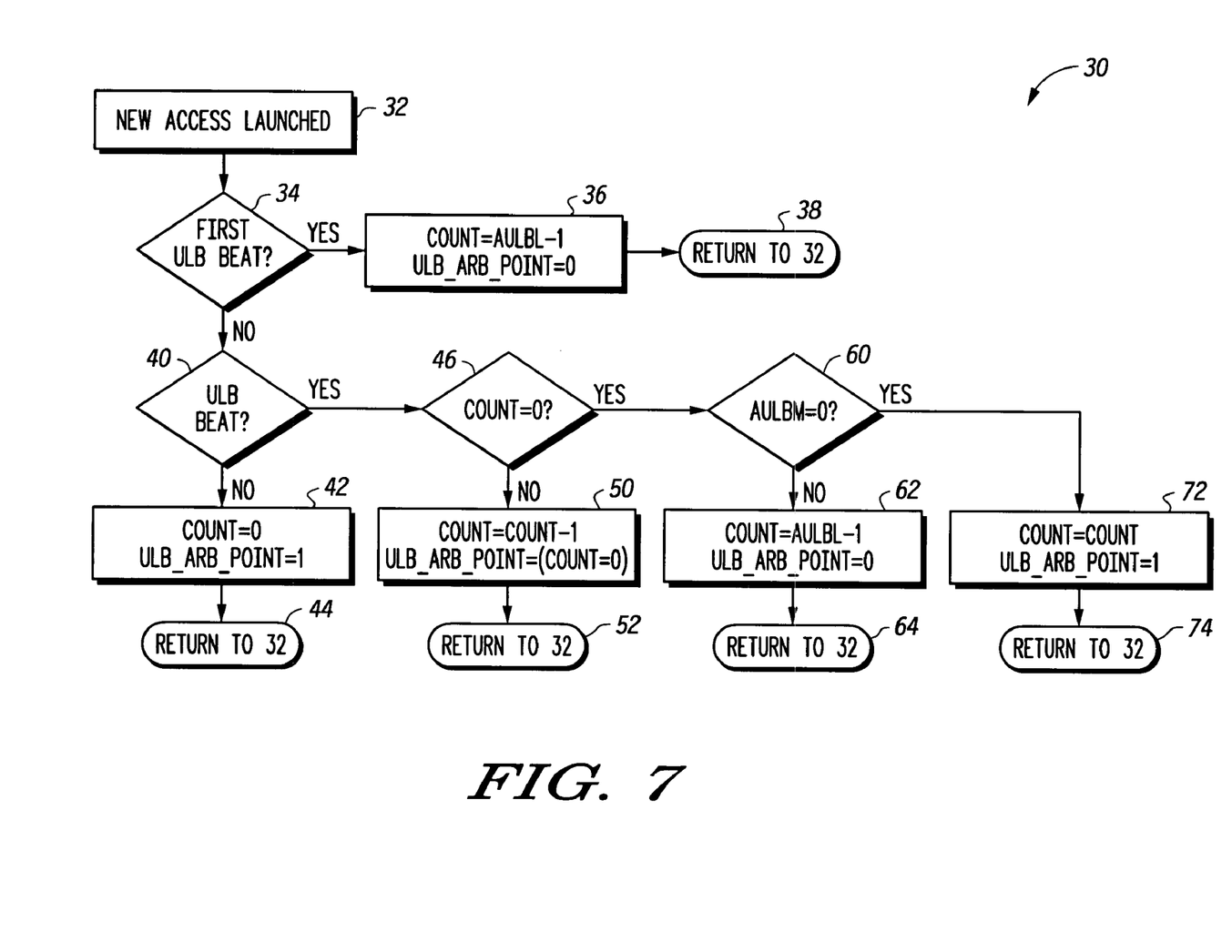
FIG. 7 illustrates in flow chart form an exemplary method of determining arbitration points in accordance with the present invention.

Illustrated in FIG. 7 is a flow chart of a method to program arbitration points for undefined length burst accesses when the AULBL field indicates that arbitration is to occur after the occurrence of two or more beats, i.e. encodings 010-111 in FIG. 5. In a step 32, a new access is launched. In a step 34, a determination is made whether a first undefined length burst beat is presently occurring. If the answer is yes, a counter is loaded with a value equal to the AULBL value minus one in a step 36 and the arbitration point assertion is negated since a new burst has begun, and since arbitration will not proceed until at least two beats have occurred. Once step 36 is performed, a step 38 is performed and a return to step 32 occurs.

If the answer at step 34 is no, a determination in a step 40 is made whether a subsequent ULB access is presently occurring. If one is not occurring, indicating that no undefined length burst is in progress, then the counter is cleared with a zero value and the arbitration point is asserted. Upon completion of step 42, a step 44 is performed wherein a return to step 32 is implemented.

If a subsequent ULB access is presently occurring as determined in step 40, then in a step 46 a determination is made as to whether the count equals zero. If the count is not equal to zero, then a step 50 is performed. The counter is decremented by one and the arbitration point is asserted if the new count value equals zero. Upon completion of the step 50, then a step 52 returns to a new access being launched in step 32.

If the count determination in step 46 is that the count equals zero, a determination is made in a step 60 whether AULBM equals zero. If AULBM does not equal zero, then a step 62 is performed. In step 62 the counter is loaded with a value of AULBL minus one in preparation for the next modulus of counting. The arbitration point is negated, since the counter must now count down again prior to reaching the next arbitration point. Upon completion of step 62, a step 64 is performed wherein a return to step 32 is performed.

If the AULBM value is determined in step 60 to be equal to zero, indicating that arbitration should be made available after initial expiration of ALUBL beats, then a step 72 is performed. In step 72 the count remains unchanged at zero, and the arbitration point is asserted since the count value equals zero. This allows arbitration to occur for beats following the initial expiration of the burst counter 26. A step 74 is then performed which returns the processing back to step 32.

By now it should be apparent that there has been provided an arbiter and method for determining arbitration points in undefined length burst accesses. As a result, arbitration points to undefined length burst accesses may be precisely bound to enable a master device to be guaranteed to achieve a certain number of burst accesses before facing arbitration. Additionally, other master devices will have opportunities to arbitrate for accesses without waiting for accesses beyond the critical accesses of the master currently in control of a slave device. An end user may program data processing hardware to provide the greatest overall system performance.

In one form, a method for arbitrating for access to a slave device has been disclosed wherein an access to the slave device by a master device is initiated. A determination is made whether the access is an undefined length burst access, wherein the undefined length burst access has an undefined number of access beats. A determination is made that a predetermined number of access beats of the undefined length burst access will be transmitted between the master device and the slave device before allowing access to the slave device to be arbitrated. Additionally, a determination is made that the predetermined number of access beats have occurred during the undefined length burst access. Arbitration for access to the slave device is allowed only after the predetermined number of access beats. The predetermined number of access beats corresponds to a value stored in a storage element of a data processing system. A counter is provided, and arbitration for access to the slave device is allowed after each time the counter counts the predetermined number of access beats. Arbitration for access to the slave device is allowed on every access beat following the predetermined number of access beats during the undefined length burst access. In another form, arbitration for access to the slave device is allowed after the predetermined number of access beats in a modulus manner. In one form the method is implemented in a data processing system having a plurality of master ports coupled to a plurality of slave ports via a crossbar switch. In another form an arbitration circuit arbitrates access to a slave device by a plurality of master devices. The arbitration circuit has an undefined length burst arbitration circuit coupled to a slave device and to a plurality of master devices. The undefined length burst arbitration circuit determines that an access to the slave device is an undefined length burst access. Arbitration of the slave device is allowed only after a predetermined time period during the undefined length burst access. A storage element stores a value corresponding to the predetermined time period. The predetermined time period corresponds to a predetermined number of beats of the undefined length burst access. In one form a counter is coupled to the storage element. The counter counts the predetermined number of beats and is reloaded after counting the predetermined number of access beats. Arbitration for access to the slave device is allowed only after each time the counter counts the predetermined number of access beats during the undefined length burst access. In one form, a counter is coupled to the storage element, the counter counting the predetermined time period, wherein arbitration for access to the slave device is allowed on every access beat following the predetermined time period during the undefined length burst access. The predetermined time period corresponds to a predetermined number of system clock cycles. In another form the counter is reloaded after counting the predetermined time period, and arbitration for access to the slave device is allowed only after each time the counter counts the predetermined time period during the undefined length burst access. In another form the counter counts the predetermined time period, wherein arbitration for access to the slave device is allowed on every access beat following the predetermined time period during the undefined length burst access. In one form the storage element is a bit field portion of a control register. Among other uses, the arbitration circuit is implemented in a data processing system having a plurality of slave devices coupled to the plurality of master devices via a crossbar switch. In another form a method for arbitrating for access to a slave device by a plurality of master devices includes initiating an access to the slave device by a master device of the plurality of master devices. A determination is made that the access is an undefined length burst access, wherein the undefined length burst access comprises an undefined number of access beats. A storage element is provided for storing a predetermined value. A counter is loaded with the predetermined value. The counter is decremented for each access beat until a counter value is equal to zero. Arbitration of access to the slave device is allowed to occur only after the counter value is equal to zero. The counter is reloaded with the predetermined value each time the counter is decremented to zero. In another form, the counter is re-loaded with the predetermined value after mastership of the slave device is lost. In one form the method is implemented in a data processing system having a plurality of master ports coupled to a plurality of slave ports via a crossbar switch. One of the plurality of master ports is coupled to a corresponding master device of the plurality of master devices, and the slave device is coupled to one of the plurality of slave ports. In one form the data processing system is implemented on an integrated circuit. The data processing system may also be implemented with multiple integrated circuits.

In the foregoing specification, the invention has been described with reference to specific embodiments. However, one of ordinary skill in the art appreciates that various modifications and changes can be made without departing from the scope of the present invention as set forth in the claims below. For example, although the present invention has been described as having a particular arbitration structure and partitioning between master port and slave ports, alternate embodiments could combine the arbitration logic into a single arbitration circuit, or could partition the arbitration control in a variety of different ways. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for arbitrating for access to a slave device, comprising:
    initiating an access to the slave device by a master device;
    determining that the access is an undefined length burst access, wherein the undefined length burst access comprises an undefined number of access beats;
    determining that a predetermined number of access beats of the undefined length burst access will be transmitted between the master device and the slave device before allowing access to the slave device to be arbitrated;
    determining that the predetermined number of access beats have occurred during the undefined length burst access; and
    allowing arbitration for access to the slave device only after the predetermined number of access beats.

2. The method of claim 1 further comprising correlating the predetermined number of access beats to a value stored in a storage element of a data processing system.

3. The method of claim 1, further comprising providing a counter, and arbitrating for access to the slave device is allowed after each time the counter counts the predetermined number of access beats.

4. The method of claim 1 further comprising arbitrating for access to the slave device on every access beat following the predetermined number of access beats during the undefined length burst access.

5. The method of claim 1, further comprising arbitrating for access to the slave device after the predetermined number of access beats in a modulus manner.

6. The method of claim 1, further comprising implementing the method in a data processing system having a plurality of master ports coupled to a plurality of slave ports via a crossbar switch.

7. An arbitration circuit for arbitrating access to a slave device by a plurality of master devices, the arbitration circuit comprising:
    an undefined length burst arbitration circuit, coupled to the slave device and to the plurality of master devices, the undefined length burst arbitration circuit for determining that an access to the slave device is an undefined length burst access, and for allowing arbitration of the slave device only after a predetermined time period during the undefined length burst access; and
    a storage element for storing a value corresponding to the predetermined time period.

8. The arbitration circuit of claim 7, wherein the predetermined time period corresponds to a predetermined number of beats of the undefined length burst access.

9. The arbitration circuit of claim 8 further comprising a counter coupled to the storage element, the counter for counting the predetermined number of beats, the counter being reloaded after counting the predetermined number of access beats, and wherein arbitration for access to the slave device is allowed only after each time the counter counts the predetermined number of access beats during the undefined length burst access.

10. The arbitration circuit of claim 8 further comprising a counter coupled to the storage element, the counter for counting the predetermined number of beats, wherein arbitration for access to the slave device is allowed on every access beat following the predetermined number of access beats during the undefined length burst access.

11. The arbitration circuit of claim 7, wherein the predetermined time period corresponds to a predetermined number of system clock cycles.

12. The arbitration circuit of claim 11 further comprising a counter coupled to the storage element, the counter for counting the predetermined number of clock cycles, the counter being reloaded after counting the predetermined number of clock cycles, and wherein arbitration for access to the slave device is allowed only after each time the counter counts the predetermined number of clock cycles during the undefined length burst access.

13. The arbitration circuit of claim 11 further comprising a counter coupled to the storage element, the counter for counting the predetermined number of clock cycles, wherein arbitration for access to the slave device is allowed following the predetermined number of clock cycles during the undefined length burst access.

14. The arbitration circuit of claim 7, wherein the storage element is a bit field portion of a control register.

15. The arbitration circuit of claim 7, wherein the arbitration circuit is implemented in a data processing system having a plurality of slave devices coupled to the plurality of master devices via a crossbar switch.

16. A method for arbitrating for access to a slave device by a plurality of master devices, comprising:

initiating an access to the slave device by a master device of the plurality of master devices;

determining that the access is an undefined length burst access, wherein the undefined length burst access comprises an undefined number of access beats;

loading a counter with a first predetermined value;

changing a count value of the counter for each access beat until a second predetermined value is reached; and allowing arbitration of access to the slave device to occur only after the count value is equal to the second predetermined value.

17. The method of claim 16, further comprising reloading the counter with the first predetermined value each time the counter reaches the second predetermined value.

18. The method of claim 16, further comprising reloading the counter with the first predetermined value after mastership of the slave device is lost.

19. The method of claim 16, further comprising implementing the method in a data processing system having a plurality of master ports coupled to a plurality of slave ports via a crossbar switch, one of the plurality of master ports being coupled to a corresponding master device of the plurality of master devices and the slave device coupled to one of the plurality of slave ports.

20. The method of claim 19, further comprising implementing the data processing system on an integrated circuit.

* * * * *